(12) United States Patent
Kröhnke et al.

(10) Patent No.: US 7,081,213 B2
(45) Date of Patent: Jul. 25, 2006

(54) STABILIZER MIXTURES FOR THE PROTECTION OF POLYMER SUBSTRATES

(75) Inventors: Christoph Kröhnke, Breisach (DE); Joseph R. Webster, Charlotte, NC (US); Ernst Gronmaier, Alischwil (CH); Lajos Avar, Riel Benken (CH)

(73) Assignee: Clariant Finance (BVI) Limited, Tortola (VG)

( * ) Notice: Subject to any disclaimer, the term of this patent is extended or adjusted under 35 U.S.C. 154(b) by 645 days.

(21) Appl. No.: 10/145,366

(22) Filed: May 14, 2002

(65) Prior Publication Data

US 2003/0234386 A1     Dec. 25, 2003

(51) Int. Cl.
  *C09K 15/22*   (2006.01)
  *C09K 15/06*   (2006.01)
  *C09K 15/08*   (2006.01)
  *C08K 5/10*    (2006.01)
  *C08K 5/20*    (2006.01)

(52) U.S. Cl. .................. 252/403; 252/401; 252/404; 252/182.29; 524/306

(58) Field of Classification Search ............... 252/399
   See application file for complete search history.

(56) References Cited

U.S. PATENT DOCUMENTS

| | | | |
|---|---|---|---|
| 3,634,320 A | | 1/1972 | Metzner et al. |
| 3,637,907 A | * | 1/1972 | Mathis et al. ............ 524/121 |
| 4,726,942 A | | 2/1988 | Lang et al. |
| 5,380,774 A | * | 1/1995 | Mulholland ............. 524/182 |
| 5,874,493 A | | 2/1999 | Webster |
| 5,965,261 A | * | 10/1999 | Webster ................. 428/364 |
| 5,969,014 A | | 10/1999 | Webster et al. |
| 6,063,843 A | * | 5/2000 | Sidqi et al. ............. 524/100 |
| 6,126,736 A | | 10/2000 | Stoll et al. |
| 6,153,676 A | | 11/2000 | Aver et al. |
| 6,864,304 B1 | * | 3/2005 | Staniek .................. 524/121 |
| 2004/0192684 A1 | * | 9/2004 | Ravichandran et al. .. 514/230.5 |

FOREIGN PATENT DOCUMENTS

| | | |
|---|---|---|
| DE | 1 801 221 | 5/1970 |
| DE | 34 03 846 | 8/1984 |
| WO | WO 01/62839 A1 * | 8/2001 |

OTHER PUBLICATIONS

G. Scott, "Atomspheric oxidation and antioxidants", 1st ed., Elserier Publisher Comp., London (1965), title page and table of contents.

Peter P. Klemchuk, et al., "Transformation products of hindered phenolic antioxidants and colour development in polyolefins", Polymer Degradation and Stability, 34, (1991) pp. 333-346.

Plastics Aditives Handbook, 5th ed., editor H. Zweifle, Hanser Publishers Munic, Germany (2001) and Hanser Gardener Publications, Cincinnati, USA (2000), chapter 1.5.1.2, pp. 11-13.

U.S. Appl. No. 09/641,116, filed Aug. 17, 2000, Stahrfeldt, et al.

U.S. Appl. No. 10/110,660, filed Oct. 30, 2000, Epacher, et al.

U.S. Appl. No. 09/843,364, filed Apr. 25, 2001, Dongiovanni, et al.

* cited by examiner

*Primary Examiner*—Joseph D. Anthony
(74) *Attorney, Agent, or Firm*—Anthony A. Bisulca

(57) ABSTRACT

A stabilizer mixture for one or more compounds of the general formula (1)

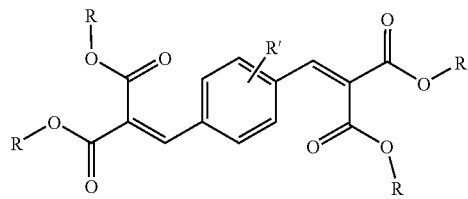

and (1A) but preferably (1), wherein the groups R independently stand for an alkyl-,

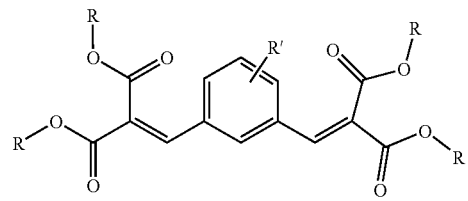

cycloalkyl-, aralkyl- or aryl-rest whereas the aromatic ring system may be optionally substituted by one or more groups R' which may be identical or different and which groups R' can be an aryl-, a saturated or unsaturated alkyl-, aralkyl- or cycloalkyl-group as well as halogen, an amino-, aminoalkyl-, aminocycloalkyl-, cyano-, thiocyano- or nitro-group.

and a UV-absorber, hindered amine stabilizer, sterically hindered phenol, organophosphite, organophosphonite, organophosphine, or mixtures thereof.

The present invention is useful in the protection of various polymeric substrates against the damaging influence of light exposure by the long term storage of polymers. This effect can be observed especially in so-called engineering plastics (such as, for example, PC, PET, PBT, ABS, TPU).

9 Claims, No Drawings

STABILIZER MIXTURES FOR THE PROTECTION OF POLYMER SUBSTRATES

The invention relates to surprising synergistic effects obtained if compounds of the class of benzylidene-bis-malonates are used in combination with other stabilizers, especially with other UV-absorbers, with hindered amine stabilizers and with sterically hindered phenols, in the protection of various polymeric substrates against the damaging influence of light exposure by the long term storage of polymers.

Benzylidene-bis-malonates are known to act as UV-absorbers. Most members of this family of compounds absorb within a limited absorption spectrum overlapping both shorter wavelengths of UVA (320 to 360 nm) and higher wavelength of the UVB spectrum (290–320 nm). Benzylidene-bis-malonates (see formula 1 below) fulfill technical requirements to provide color neutrality together with low volatility and high light absorptivity, which has been already disclosed in the U.S. Pat. No. 3,634,320.

It has surprisingly been found that mixtures comprising well-known stabilizers and one or more compounds of the formula 1 (below) have an improved protective action on the properties of a big variety of polymer substrates. This finding constitutes an important technical improvement of the state of the art.

The invention therefore relates to mixtures of one or more compounds of the general formula

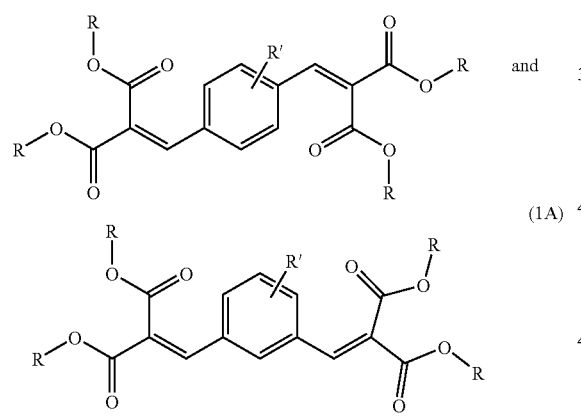

but preferably (1), wherein the groups R independently stand for an alkyl-, cycloalkyl-, aralkyl- or aryl-rest whereas the aromatic ring system may be optionally substituted by one or more groups R' which may be identical or different and which groups R' can be an aryl-, a saturated or unsaturated alkyl-, aralkyl- or cycloalkyl-group as well as halogen, an amino-, aminoalkyl-, aminocycloalkyl-, cyano-, thiocyano- or nitrogroup; and any one of a UV-absorber, hindered amine stabilizer, sterically hindered phenol, organophosphite, organophosphonite, organophosphine, or mixtures thereof.

UV-absorbers are o-hydroxy-benzophenones or o-hydroxyphenyl-benzotriazoles or benzoates, cinnamates, oxanilides or salicylates. Hindered amine stabilizers are the well known derivatives of amino-tetra-alkyl-piperidines. Sterically hindered phenols are most widely used stabilizers for polymers where the steric hindrance by substituents, e.g. tertiary butyl groups in the 2- and 6-position influences the stability of the intermediately formed phenoxyl radical. Those compounds are described e.g. in the "Plastics Additives Handbook", 5$^{th}$ edition, editor H. Zweifel, Hanser Publishers Munic, Germany (2001) and Hanser Gardner Publications, Cincinnati, USA (2000), chapter 1.5.1.2, pp. 11–13.

A general, and non-limiting, description of the phenols capable of use with the present invention are given by the formula α and β in which

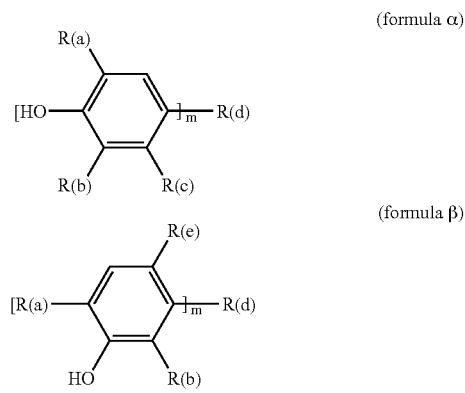

in which m is the number 1 or 3,

R(a) is $C_1$–$C_{18}$-alkyl, $C_5$–$C_{12}$-cyclo-alkyl, phenyl or $C_7$–$C_9$-phenyl-alkyl, R(b) is hydrogen, $C_1$–$C_{18}$-alkyl, $C_5$–$C_{12}$-cyclo-alkyl, phenyl or $C_7$–$C_9$-phenyl-alkyl, R(c) is hydrogen or methyl;

if m is 1, R(d) is hydrogen, $C_1$–$C_4$-alkyl or

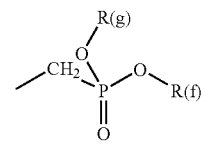

If m is 3,
R(d) is

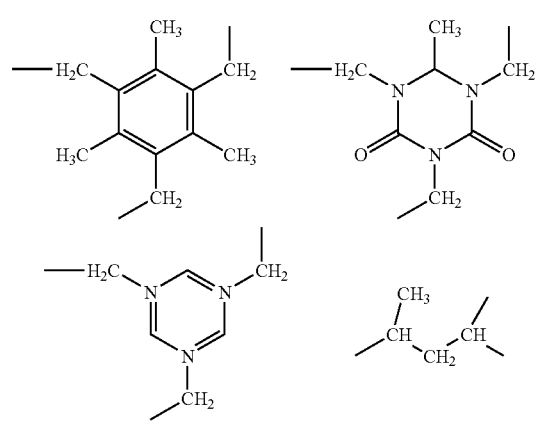

R(e) is hydrogen or methyl,
R(f) is hydrogen, $C_1$–$C_{20}$-alkyl, unsubstituted or $C_1$–$C_4$-alkyl-substituted phenyl or naphthyl,
R(g) is $C_1$–$C_{20}$-alkyl, unsubstituted or $C_1$–$C_4$-alkyl-substituted phenyl or naphthyl.

The following sterically hindered phenols (compounds I–VIII) can be used alone or as mixtures:

bis-[3,3-bis-(4'-hydroxy-3'-tert.butyl)-butanoic acid]-glycolester (I),

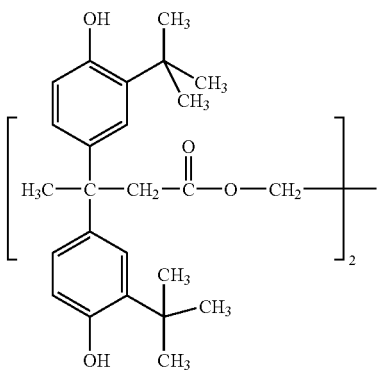

4,4',4"-[(2,4,6-trimethyl-1,3,5-benzenetriyl)tris(methylene)]-tris[2,6-bis(1,1-dimethylethyl)phenol] (II),

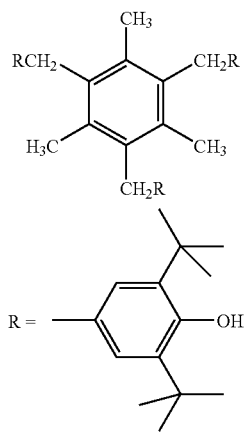

1,3,5-triazine-2,4,6(1H,3H,5H)-trione-1,3,5-tris[[4-(1,1-dimethylethyl)-3-hydroxy-2,6-dimethylphenyl]methyl] (III),

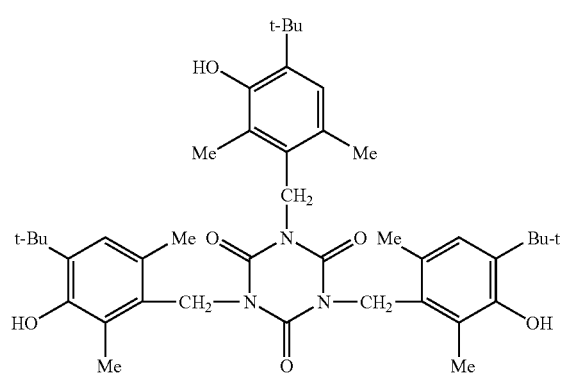

phenol,4,4',4"-(1-methyl-1-propanyl-3-ylidene)tris[2-(1,1-dimethylethyl)-5-methyl (IV),

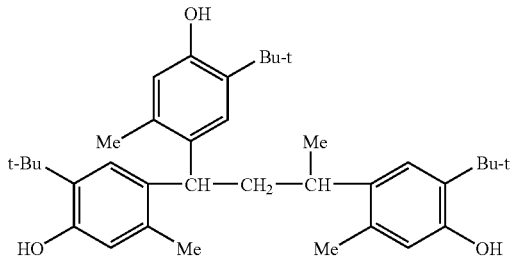

phenol, 2,6-bis[[3-(1,1-dimethylethyl)-2-hydroxy-5-methylphenyl]octahydro-4,7-methano-1H-indenyl]-4-methyl (V),

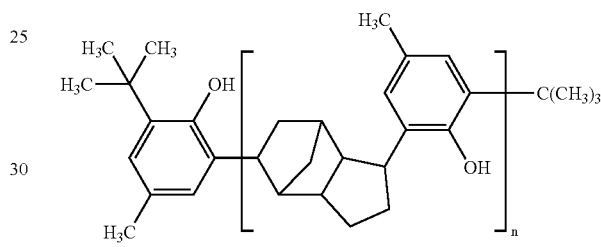

benzenepropanoic acid, 3-(1,1-dimethylethyl)-4-hydroxy-5-methyl-, 2,4,8,10-tetraoxa-spiro[5.5]undecane-3,9-diyl-bis(2,2-dimethyl-2,1-ethanediyl)ester (VI),

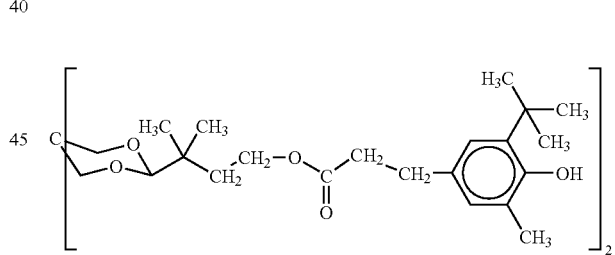

tetrakismethylene(3,5-di-tert.butyl-4-hydroxyphenyl)-hydrocinnamate (VII)

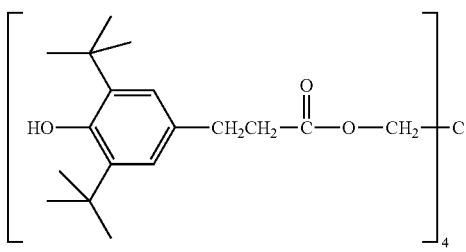

and octadecyl-3,5-bis(1,1-dimethylethyl)-4-hydroxybenzenepropanoate (VIII),

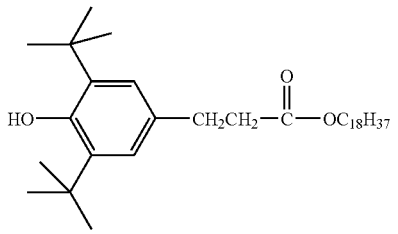

Preferably, mixtures of benzylidene-bis-malonates and compounds of the formula 2

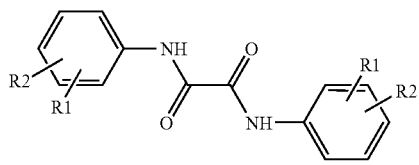
(formula 2)

wherein $R_1$ and $R_2$ are each independently, hydrogen or identical or different substituents selected from linear and branched alkyl- or alkoxy-groups having from 2 to 12 carbon atoms and from 1 to 4 oxygen atoms, are used according to the invention.

Preferably one R group on each ring is hydrogen, one is ethyl and the other is a $C_1$ to $C_4$ alkoxy-group.

Particular preference is given to the use of mixtures of benzylidene-bis-malonates and reaction products of compounds represented by the formula (3) or (4) shown below

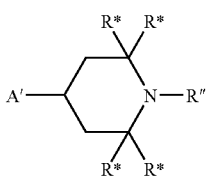
(formula 3)

in which A' comprises a functional group which is an amine, or A' contains a hydrolyzable group, e.g. amide, which forms an amine, or A' is an amide-forming group, R* is methyl or other lower ($C_2$–$C_4$ alkyl) and R'' is selected from the group consisting of hydrogen; alkyl of 1 to 8 carbons and —$OR_3$ in which $R_3$ is selected from the group consisting of hydrogen, methyl, and alkyl containing 1 to 7 carbons;

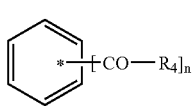
(formula 4)

n = 2, 3 or 4 including dimers and trimers, in which at least one of $R_4$ is —OH, —OR, and at least one

($R_a$)

($R_b$)

($R_c$)

of $R_4$ is $R_a$, $R_b$ or $R_c$.

wherein R* is defined above, and R' has the same meaning as A' above. R5 is selected from the group consisting of hydrogen, alkyl or cycloalkyl with 1 to 6 carbon atoms.

Non-limiting examples of compounds of formula 4 are compounds represented by formula (5)–(11):

(formula 5)

(formula 6)

(formula 7)

(formula 8)

(formula 9)

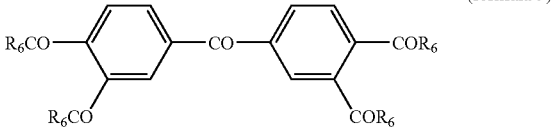
(formula 10)

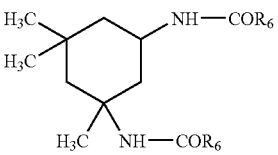

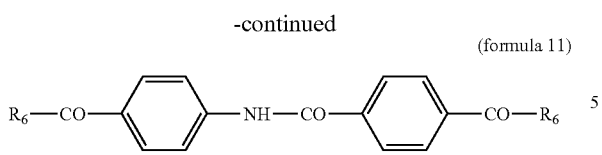
(formula 11)

In compounds of formula 5–11 R6 can be either formula (a') or (a")

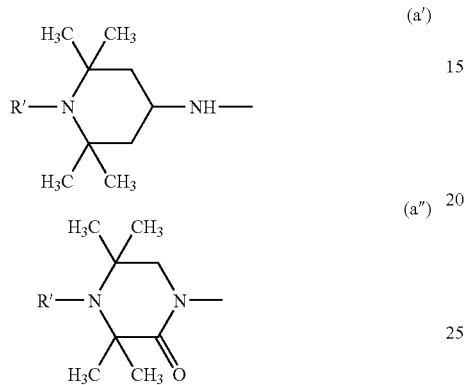

where R' in a' and a" is hydrogen, $C_{1-8}$alkyl, e.g., —$CH_3$, —$CH_2CH_3$, $C_{1-4}$alkoxy, e.g., —$OCH_3$, —$OCH_2CH_3$ or —CO—$C_{1-4}$alkyl, e.g., —O—CO—$CH_3$, —O—CO—$CH_2CH_3$.

If A' is an aminofunction, R' is preferably selected from the group consisting of —(NH)$R_5$ where $R_5$ is hydrogen or alkyl of 1 to 8 carbons; carboxyl; carboxylic acid derivative; —$(CH_2)_x(NH)R'_5$, in which x is an integer of from 1 to 6 and $R'_5$ is hydrogen or alkyl of 1 to 8 carbons; —$(CH_2)_y$COOH, in which y is an integer of from 1 to 6; and —$(CH_2)_y$COOH acid derivative in which y is an integer of from 1 to 6. Most preferably R' is —$NH_2$, —COOH, or —COOH acid derivative. Preferred —COOH derivatives are isophthalic acid and terephthalic acid.

Very particular preference is given to the use of mixtures of benzylidene-bis-malonates and reaction products of compounds of formula 3 or 4 where the compounds of formula 3 is one or more of the following compounds: 3-amino-2,2,6,6-tetramethyl-piperidine, 4-amino-2,2,6,6-tetramethyl-piperidine, 4-aminoalkyl-2,2,6,6-tetramethyl-piperidine, 4-aminoaryl-2,2,6,6-tetramethyl-piperidine, 3-aminoalkyl-2,2,6,6-tetramethyl-piperidine, 3-aminoaryl-2,2,6,6-tetramethyl-piperidine, 1,2,2,6,6-pentamethyl-4-aminopiperidine, 1-cyclohexyloxy-2,2,6,6-tetramethyl-piperidine, 1-hexyloxy-2,2,6,6-tetramethyl-piperidine, 2,2,6,6-tetramethyl-piperidine-4-alkyl-carboxylic acid, 2,2,6,6-tetramethyl-piperidine-4-arylcarboxylic acid, 2,2,6,6-tetramethyl-piperidine-3-alkylcarboxylic acid, and 2,2,6,6-tetramethyl-piperidine-3-arylcarboxylic acid.

Preferred derivatives of formula 4 are isophthalic acid and terephthalic acid. Another preferred group of mixtures according to the invention are mixtures of benzylidene-bis-malonates with sterically hindered phenols as explained above.

The organophosphines suitable for use with the present invention include, but are not limited to those given in List 1, with $R_7$ equal to $C_{1-24}$ alkyl linear or branched (in case also containing heteroatoms N, O, P, S), $C_{5-30}$ cycloalkyl (in case also containing heteroatoms N, O, P, S), $C_{1-30}$ alkylaryl, $C_{6-24}$ aryl, $C_{4-24}$ heteroaryl (single or multiple substituted by $C_{1-18}$ alkyl (linear or branched)), $C_{5-12}$ cycloalkyl or $C_{1-18}$ alkoxy; $R_8$ equal to $C_{4-24}$ alkyl linear or branched (in case also containing heteroatoms N, O, P, S), $C_{5-30}$ cycloalkyl (in case also containing heteroatoms N, O, P, S), $C_{1-30}$ alkylaryl, $C_{6-24}$ aryl, $C_{4-24}$ heteroaryl (single or multiple substituted by $C_{1-18}$ alkyl (linear or branched)), $C_{5-12}$ cycloalkyl or $C_{1-18}$ alkoxy. D equal to $C_{1-30}$ alkylene linear or branched (in case also containing heteroatoms N, O, P, S), $C_{2-30}$ alkylidene (in case also containing heteroatoms N, O, P, S), $C_{5-12}$ cycloalkylene (in case also containing heteroatoms N, O, P, S), or $C_{6-24}$ arylene/$C_{4-24}$ heteroarylene (single or multiple substituted by $C_{1-18}$ alkyl (linear or branched)), $C_{5-12}$ cycloalkyl or $C_{1-18}$ alkoxy, —O—, —S—

Q is 1 to 5;

R is 3 to 6;

wherein the groups P—$R_8$ in formula (XII) can be part of a P-containing ring system, indicated by * on the bonds coming from this P-atom.

List 1

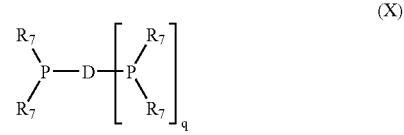

Non-limiting examples of the organophosphonites capable of use in accordance with the present invention include:

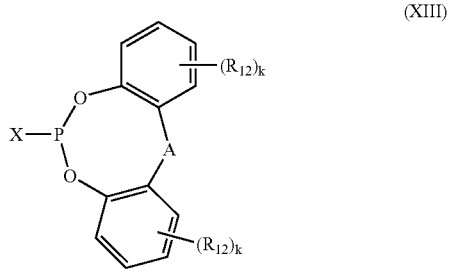

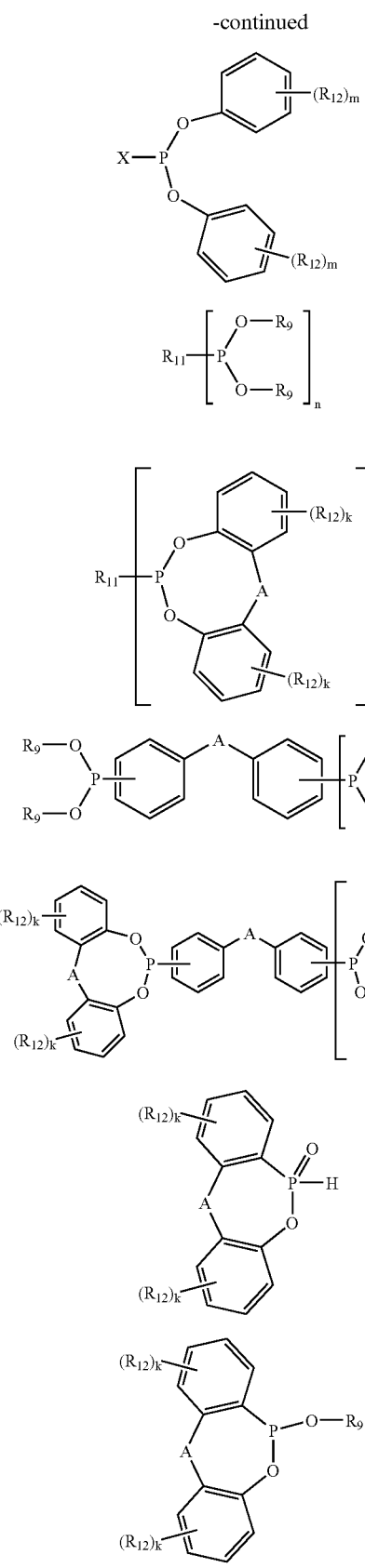

wherein, independently of one another, $R_9$ is $C_1-C_{24}$ alkyl (linear or branched, where appropriate also containing heteroatoms N, O, P, S), $C_5-C_{30}$-cycloalkyl (where appropriate also containing heteroatoms N, O, P, S), $C_1-C_{30}$-alkylaryl, $C_6-C_{24}$-aryl or heteroaryl, $C_6-C_{24}$-aryl or heteroaryl (substituted with the groups $C_1-C_{18}$-alkyl (linear or branched), $C_5-C_{12}$-cycloalkyl or $C_1-C_{18}$ alkoxy);

$R_{11}$ is n-valent groups of the type $C_1-C_{30}$-alkylene (linear or branched, where appropriate also containing heteroatoms N, O, P, S), $C_1-C_{30}$-alkylidene (where appropriate also containing heteroatoms N, O, P, S), $C_5-C_{12}$-cycloalkylene or $C_6-C_{24}$-arylene (where appropriate substituted with $C_1-C_{18}$ alkyl (linear or branched), $C_5-C_{12}$-cycloalkyl or $C_1-C_{18}$ alkoxy);

$R_{12}$ is $C_1-C_{24}$ alkyl (linear or branched, where appropriate also containing heteroatoms N, O, P, S), $C_5-C_{30}$-cycloalkyl (where appropriate also containing heteroatoms N, O, P, S), $C_1-C_{30}$-alkylaryl, $C_6-C_{24}$-aryl or heteroaryl, $C_6-C_{24}$-aryl or heteroaryl (substituted with the groups $C_1-C_{18}$-alkyl (linear or branched), $C_5-C_{12}$-cycloalkyl or $C_1-C_{18}$-alkoxy);

A is a direct bond, $C_1-C_{30}$-alkylidene (where appropriate also containing heteroatoms N, O, P, S), >NH, >NR$_8$, —S—, >S(O), >S(O)$_2$, —O—;

X is Cl, Br, F, OH (including the resulting tautomeric form >P(O)H);

k is from 0 to 4;

n is from 1 to 4;

m is from 0 to 5; and p is 0 or 1.

Non-limiting examples of the organophosphites capable of use in accordance with the present invention include:

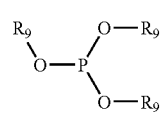
(XXI)

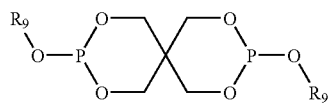
(XXII)

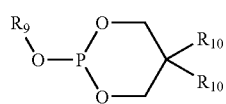
(XXIII)

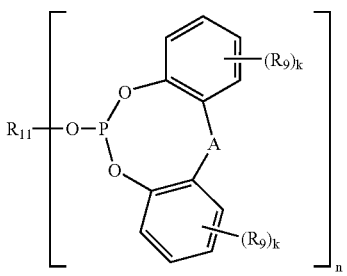
(XXIV)

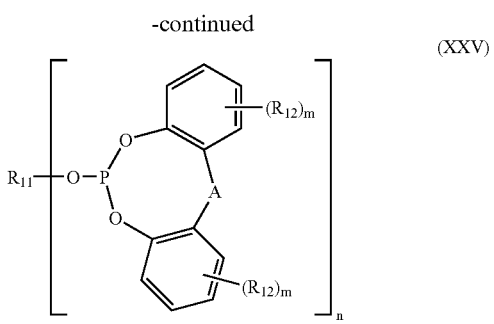

(XXV)

wherein $R_9$, $R_{11}$, $R_{12}$, A, X, k, n, m, and p are as defined above and $R_{10}$ is H, $C_1$–$C_{24}$ alkyl (linear or branched, where appropriate also containing heteroatoms N, O, P, S), $C_5$–$C_{30}$-cycloalkyl (where appropriate also containing heteroatoms N, O, P, S), $C_1$–$C_{30}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_{12}$-cycloalkyl or $C_1$–$C_{18}$-alkoxy).

The ratio used of the two components in the mixtures according to the invention can vary to a large extent and can be from 1:99 to 99:1, preferably from 1:10 to 10:1 and more preferably from 1:2 to 2:1, depending on the compounds used and the application conditions.

Preferred amounts of the mixture to be used, with respect to the amount of the particular polymer substrate, are from 0.001 to 3.000 parts per hundred parts of the polymer.

Particularly preferred amounts are 0.01 to 1.00 parts per hundred parts of the polymer.

The mixtures according to the invention are especially suitable for the stabilization of polymer substrates which are so-called "engineering"plastics, i.e. polyesters, polyamides, polycarbonates, polystyrene and copolymers of styrene, especially poly-acrylonitrile-butadiene-styrene (ABS), polyurthanes and particularly thermoplastic polyurethanes (TPU), polyacetals, polyarylsulfides and polyarylsulfones, polyimides, especially thermoplastic polyimides, polyetherimides, polyacrylates and polymethacrylates (PMMA), ethylene-acrylic—and methacrylic-copolymers and their metal salts ("ionomers"), polyaryletherketones, polyphenyleneether-blends, polybenzimidazoles, polysiloxanes, liquid crystalline polymers, copolyesteramides, thermoplastic vulcanisates, polyvinylpyridines and cellulose-esters.

Particularly advantageous effects from the use of the present invention are also obtained in the following "engineering" plastics: polyesters, polycarbonates, poly-acrylonitrile-butadiene-styrene (ABS), thermoplastic polyurethanes (TPU), polyacetals, polyarylsulfides and polyarylsulfones, thermoplastic polyimides, polyacrylates and polymethacrylates (PMMA), ethylene-acrylic—and methacrylic-copolymers and their metal salts ("ionomers"), polyaryletherketones, polyphenyleneether-blends, polybenzimidazoles, polysiloxanes, liquid crystalline polymers, copolyesteramides, thermoplastic vulcanisates, polyvinylpyridines and cellulose-esters.

The mixtures according to the invention may, however, be used for stabilizing any polymer materials; non-limiting examples of which include:

1. Polymers of mono- and diolefins, for example polypropylene, polyisobutylene, polybut-1-ene, poly-4-methylpent-1-ene, polyisoprene or polybutadiene and polymers of cycloolefins such as cyclopentene or norbornene; in addition polyethylene (which may optionally be crosslinked), e.g. high-density polyethylene (HDPE), low-density polyethylene (LDPE), linear low-density polyethylene (LLDPE), branched low-density polyethylene (BLDPE). Polyolefins, i.e. polymers of monoolefins, in particular polyethylene and polypropylene, can be prepared by various processes, especially by the following methods:
   a) free-radical (usually at high pressure and high temperature).
   b) by means of a catalyst, where the catalyst usually comprises one or more metals of groups IVb, Vb, VIb or VII. These metals usually have one or more ligands such as oxides, halides, alkoxides, esters, ethers, amines, alkyls, alkenyls and/or aryls, which can be either -π- or σ-coordinated. These metal complexes can be free or fixed to supports, such as on activated magnesium chloride, titanium chloride, aluminum oxide or silicon oxide. These catalysts can be soluble or insoluble in the polymerization medium. The catalysts can be active as such in the polymerization, or other activators can be used, for example metal alkyls, metal hydrides, metal alkylhalides, metal alkyloxides or metal alkyloxanes, the metals being elements of Groups Ia, IIa and/or IIIa. The activators can be modified, for example, with further ester, ether, amine or silyl ether groups. These catalyst systems are usually termed Phillips, Standard Oil Indiana, Ziegler (Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and diolefins with one another or with other vinyl monomers, for example ethylene-propylene copolymers, linear low-density polyethylene (LLDPE) and mixtures thereof with low-density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene and isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers), as well as terpolymers of ethylene with propylene and a diene such as hexadiene, dicyclopentadiene or ethylidene-norbornene; in addition mixtures of such copolymers with one another and with polymers mentioned under 1), for example polypropylene/ethylene-propylene copolymers, LDPE-ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methylacrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

7. Graft copolymers of styrene or α-methylstyrene, for example styrene on polybutadiene, styrene on polybutadiene-styrene or polybutadiene-acrylon-itrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene-propylene-diene terpolymers. Styrene and acrylonitrile on polyalkyl acrylates or polyalkyl methacrylates, styrene and acrylonitrile on acrylate-butadiene copolymers, as well as mixtures thereof with the copolymers mentioned under 6), for example as known as ABS, MBS, ASA or AES polymers.

8. Halogen-containing polymers, such as polychloroprene, chlorinated rubber, chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β-unsaturated acids and derivatives thereof, such as polyacrylates and polymethacrylates, polymethyl methacrylates, polyacrylamides and polyacrylonitriles impact-modified with butyl acrylate.

10. Copolymers of the monomers mentioned under 9) with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1).

12. Homopolymers and copolymers of cyclic ethers, such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and polyphenylene sulphides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as nylon 4, nylon 6, nylon 6/6, 6/10, 6/9, 6/12, 4/6, 12/12, nylon 11 and nylon 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide, block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. In addition, polyamides or copolyamides modified with EPDM or ABS, and polyamides condensed during processing ("RIM polyamide systems").

17. Polyureas, polyimides, polyamide-imides, and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, poly-hydroxybenzoates, as well as block polyether esters derived from hydroxyl-terminated polyethers; in addition, polyesters modified with polycarbonates or MBS.

19. Polycarbonates and polyester carbonates.

20. Polysulphones, polyether sulphones and polyether ketones.

21. Crosslinked polymers derived from aldehydes on the one hand and phenols, urea or melamine on the other hand, such as phenol-formaldehyde resins, urea-formaldehyde resins and melamine-formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing low-flammability modifications thereof.

24. Crosslinkable acrylic resins derived from substituted acrylates, for example from epoxy acrylates, urethane acrylates or polyester acrylates.

25. Alkyd resins, polyester resins and acrylate resins crosslinked with melamine resins, urea resins, polyisocyanals or epoxy resins.

26. Crosslinked epoxy resins derived from polyepoxides, for example from bis-glycidyl ethers or from cycloaliphatic diepoxides.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

29. Natural and synthetic organic substances which constitute pure monomeric compounds or mixtures thereof, for example mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

30. Aqueous emulsions of natural or synthetic rubbers, such as natural rubber latex or latices of carboxylated styrene-butadiene copolymers.

In these polymers, further additives may be present, for example:

1. Antioxidants 1.1 Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 24a-methylcyclohexyl)-4,6-dimethylphenol, 2,6-dioctadecyl-4-methylphenol, 2,4,6-tricyclohexylphenol, 2,6-di-tert-butyl-4-meth-oxymethylphenol, 2,6-dinonyl-4-methylphenol, 2,4-dimethyl-6-(1'-methylundec-1'-yl) phenol, 2,4-dimethyl-6-(1'-methylheptadecyl)phenol, 2,4-dimethyl-6-(1'-methyltridec-1'-yl)phenol and mixtures thereof.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecyl-thiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-di-phenyl-4-octadecyloxyphenol, 2,6-di-tert-butylhydroquinone, 2,5-di-tert-butyl-4-hydroxy-anisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4 Tocopherols, for example α-tocopherol, β-tocopherol, γ-tocopherol, δ-tocopherol and mixtures thereof (vitamin E).

1.5 Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis (3,6-di-sec-amylphenol), 4,4'-bis(2,6-dimethyl-4-hydroxyphenyl)disulphic.

1.6 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methyl-cyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidene-bis(4,6-di-tert-butylphenol), 2,2'-ethylidenebis(6-tert-butyl-4-isobutylphenol), 2,2'-methy-lenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-1-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis'(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-di-methyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7 O-, N- and S-benzyl compounds, for example 3,5,3',5'-tetra-tert-butyl-4,4'-dihydroxydibenzyl ether, octadecyl 4-hydroxy-3.5-dimethylbenzyl mercaptoacetate, tris(3,5-di-tert-butyl-4-hydroxybenzyl)amine, bis(4-tert-butyl-3-hydroxy-2,6-dimethyl-benzyl)dithioterephthalate, b is(3, 5-di-tert-butyl-4-hydroxybenzyl)sulphide, isooctyl 3,5-di-tert-butyl-4-hydroxybenzyl mercaptoacetate.

1.8 Hydroxybenzylated malonates, for example dioctadecyl 2,2-bis(3,5-di-tert-butyl-2-hydrorybenzyl)malonate, dioctadecyl 2-(3-tert-butyl-4-hydroxy-5-methylbenzyl)-malonate, didodecyl mercaptoethyl-2,2-bis(3,5-di-tert-butyl-4-hydroxybenzyl)malonate, di[4-(1,1,3,3-tetramethylbutyl)phenyl], 2,2-bis(3,5-di-tert-butyl-4-hydroxybenzyl)malonate.

1.9 Aromatic hydroxybenzyl compounds, for example 1,3, 5-tris(3,5-di-tert-buty)-4-hydroxybenzyl)-2,4,6-trimethylbenzene, 1,4-bis(3,5-di-tert-butyl-4-hydroxybenzyl)-2, 3,5,6-tetramethylbenzot, 2,4,6-tris(3,5-di-tert-buryl-4-hydroxybenzyl)phenol.

1.10 Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octyl-mercapto-4,6-bis(3,5-di-tert-butyl-4-hydroxyphenoxy)-1,3,5-triazine, 2,4,6-tris(3, 5-di-tert-butyl-4-hydroxyphenoxy)-1,2,3-triazine, 1,3,5-tris-(3,5-di-tert-butyl-4-hydroxybenzyl)isocyanurate, 1,3, 5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11 Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methyl-benzylphosphonate, the Ca salt of the monoethyl ester of 3,5-di-tert-butyl-4-hydroxybenzylphosphonic acid.

1.12 Acylaminophenols, 4-hydroxylauramide, 4-hydroxystearanilide, octyl N-(3,5-di-tert-butyl-4-hydroxyphenyl) carbamate.

1.13 Esters of β-(3,5-di-tert-butyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethyl-hexanediol, trimethylolpropane, 4-hydroxymethyl-1-phospha-2,6,7-trioxabicyclo-[2.2.2]octane.

1.14 Esters of β-(5-tert-butyl-4-hydroxy-3-methylphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabi-cyclo[2.2.2]octane.

1.15 Esters of β-(3,5-dicyclohexyl-4-hydroxy-phenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3 thiaundecanol, 3-thiapentadecanol, trimethyl-hexanediol, trimethylolpropane, 4-hydroxymethyl-1-phospha-2,6,7-trioxabicyclo-[2.2.2]octane.

1.16 Esters of 3,5-di-tert-butyl-4-hydroxyphenylacetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N-bis-(hydroxyethyl)oxalamide, 3-thia-undecanol, 3-thiapentadecanol, trimethyl-hexanediol, trimethylolpropane, 4-hydroxymethyl-1-phospha-2,6,7-trioxabicyclo-[2.2.2]octane.

1.17 Amides of β-(3,5-di-tert-butyl-4-hydroxy-phenyl)propionic acid, e.g. N,N'-bis(3,5-di-tert-butyl4-hydroxyphenylpropionyl)hexamethylenediamine, N,N'-bis(3,5-di-tert-butyl-4-hydroxyphenylpro-pionyl) trimethylenediamine, N,N'-bis(3,5-di-tert-butyl-4-hydroxy-phenylpropionyl)hydrazine.

2. UV Absorbers and Light Stabilizers 2.1 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole. 2-(5'-tert-butyl-2'-hydroxyphenyl)benzotriazole, 2-(2'-hydroxy-5'-(1,1.3,3-tetramethylbutyl)phenyl)benzo-triazole, 2-(3',5'-di-tert-butyl-2'-hydroxyphenyl)-5-chlorobenzotriazole, 2-(3-tert-butyl-2'-hydroxy-5'-methylphenyl)-5-chlorobenzotriazole, 2-(3'-sec-butyl-5'-tert-butyl-2'-hydroxy-phenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl-2'-hydroxyphenyl)-benzotriazole, a mixture of 2-(3'-tert-butyl-2'-hydroxy-5'-(2-octyloxycarbonylethyl)-phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonyl-ethyl)phenyl)benzotriazole, 2-(3'-tert-butyl-2'-hydroxy-5'-(2-octyloxycarbonylethyl)-phenyl) benzotriazole, 2-(3'-tert-butyl-5'-[2-(2-ethylhexyloxy) carbonylethyl]-2'-hydroxy-phenyl)benzotriazole, 2-(3'-dodecyl2'-hydroxy-5'-methylphenyl)benzotriazole and 2-(3'-tert-butyl-2'-hydroxy-5'-(2-isooctyloxycarbonyl-ethyl)phenyl-benzotriazole, 2,2'-methy-lene-bis[4(1,1,3,3-tetramethylbutyl)-6-benzotriazol-2-ylphenol]; the transesterification product of 2-[3-tert-butyl-5'-(2-methoxycarbonylethyl)-2'-hydroxy-phenyl]benzotriazole with polyethylene glycol 300, [R—CH$_2$CH$_2$—COO(CH$_2$)$_3$]$_2$ where R=3'-tert-butyl-4'-hydroxy-5'-2H-benzotriazol-2-yl-phenyl.

2.2 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3 Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butyl-phenyl 3,5-di-tert-butyl-4-hydroxy-benzoate.

2.4 Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxycinnamate or butyl α-cyano-β-methyl-p-methoxycinnamate, methyl α-carbo-methoxy-p-methoxycinnamate and N-(β-carbomethoxy-β-cyanovinyl)-2-methylindoline.

2.5 Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6 Sterically hindered amines, for example bis(2,2,6,6-tetramethylpiperidyl)sebacate, bis(2,2,6,6-tetramethylpiperidyl)succinate, bis(1,2,2,6,6-pentamethylpiperidyl)sebacate, bis(1,2,2,6,6-pentamethylpiperidyl)n-butyl-3,5-di-tert-butyl-4-hydroxybenzyl-malonate, the condensation product of 1-hydroxyethyl-2,2,6,6-tetramethyl-4-hydroxypiperidine and succinic acid, the condensation product of N,N'-bis-(2,2,6,6-tetramethyl-4-piperidyl)hexamethylenediamine and 4-tert-octylamino-2,6-dichloro-1,3,5-s-triazine, tris-(2,2,6,6-tetramethyl-4-piperidyl)nitrilotriacetate, tetrakis(2,2,6,6-tetramethyl-4-piperidyl)1,2,3,4-butanetetraoate, 1,1'-(1,2-ethanediyl)-bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)2-n-butyl-2-(2-hydroxy-3,5-di-tert-butylbenzyl)malonate, 3-n-octyl-7,7,9,9-tetramethyl-1,3,8-triazaspiro[4.5]de-cane-2,4-dione, bis(1-octyloxy-2,2,6,6-tetramethylpiperidyl)sebacate, bis-(1-octyloxy-2,2,6,6-tetramethylpiperidyl)succinate, the condensation product of N,N'-bis(2,2,6,6-tetramethyl-4-piperidyl)hexamethylenediamine and 4-morpholino-2,6-dichloro-1,3,5-triazine, the condensation product of 2-chloro-4,6-di-(4-n-butylamino-2,2,6,6-tetramethylpiperidyl)-1,3,5-triazine and 1,2-bis-(3-aminopropylamino)ethane, the condensation product of 2-chloro-4,6-di-(4-n-butylamino-1,2,2,6,6-pentamethyl-piperidyl)-1,3,5-triazine and 1,2-bis-(3-aminopropylamino)ethane, 8-acetyl-3-dodecyl-7,7,9,9-tetramethyl-1,3,8-triaz-aspiro[4.5]de-cane-2,4-dione, 3-dodecyl-1-(2,2,6,6-tetra-methyl-4-piperidyl)pyrrolidine-2,5-dione, 3-dodecyl-1-(1,2,2,6,6-pentamethyl-4-piperidyl)pyrrolidine-2,5-dione.

2.7 Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyl-oxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy-disubstituted and of o- and p-ethoxy-disubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethyl-phenyl)-1,3,5-triazine, 2-(2,4-dihydroxy- phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine.
3. Metal deactivators, for example, N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyl-oylamino-1,2,4-triazole, bis(benzylidene)-oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.
4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butyl-phenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxy pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl)methyl phosphite, bis(2,4-di-tert-butyl-6-methylphenyl)ethyl phosphite.
5. Peroxide scavengers, examples being esters of β-thiodipropionic acid, for example the lauryl, stearyl, myristyl or tridecyl ester, mecaptobenzimidazole, the zinc salt of 2-mercaptobenzimidazole, zinc dibutyldithiocarbamate, dioctadecyl disulphide, pentaerythritol tetrakis(β-dodecylmercapto)propionate.
6. Polyamide stabilizers, examples being copper salts in combination with iodides and/or phosphorus compounds and salts of divalent manganese.
7. Basic costabilizers, examples being melamin, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example Ca stearate, Zn stearate, Mg behenate, Mg stearate, Na ricinoleate, K palmitate, antimony pyrocatecholate or tin pyrocatecholate.
8. Nucleating agents, such as benzoic acid, 4-tert-butylbenzoic acid, adipic acid; diphenylacetic acid and their salts, phosphates, phosphonates and phosphinates and their esters and salts or clarifiers, such as derivatives of dibenzylidene sorbitol.
9. Fillers and reinforcing agents, examples being calcium carbonate, silicates, glass fibers, asbestos, talc, kaolin, mica, barium sulphate, metal oxides and hydroxides, carbon black, graphite.
10. Other additives, examples being plasticizers, lubricants, emulsifiers, pigments, optical brighteners, flameproofing agents, antistatics, blowing agents.

Any additional additives can be added to the polymers before, together with or after addition of the stabilizer mixtures of the invention. These additives and also the stabilizer mixtures of the invention can be added in this case as solid, in solution or melt as well as in the form of solid or liquid mixtures or masterbatches/concentrates.

The advantageous action of the mixtures according to the invention can be shown by the examples below, but the applicability to similar areas is not to be restricted by this.

EXAMPLE 1

Effects in Polybutyleneterephthalate (PBT)

PBT has been stabilized by melt compounding a masterbatch and letting down this master batch into PBT resin followed by fiber spinning. Subsequent analysis of the additive levels in the fibers was determined prior to UV-exposure. Spinning of natural, non-pigmented bulk continuous filaments (BCF) took place at 265° C., which have been oriented in line at 3.5:1 ratio.

Card wraps of these fibers were exposed on one side in a Q(Quartz).U.V. accelerated weathering test apparatus[1] equipped with UVB-313 lamps in accordance with ASTM D 4329-84. The cycle was alternating eight hours of UV exposure at 60° C. and four hours of condensation at 50° C. Multiple specimens from each formulation were used in the test and removed at periodic intervals for evaluation.

Similarly, the exposure of PBT fibers on card wraps took place in an accelerated weathering tester equipped with UVA 340 lamps. The testing procedure followed ASTM D-4329-84 as well. The QUV instrument equipped with UVA-340 lamps was set to eight hours. UV at 60° C. and four hrs. condensation at 40° C. This set of conditions represents 16 hrs. of UV exposure and eight hrs. of moisture per 24 hour period. As recommended, the test time was 720 hours total time. The determination of color of each sample took place with a spectrophotometer measuring, $\Delta b^*$ color changes.

[1] The QUV Accelerated Weathering Tester reproduces the damage caused by sunlight, rain and dew. The QUV tests materials by exposing them to alternating cycles of light and moisture at controlled, elevated temperatures. The QUV simulates the effect of sunlight with fluorescent ultraviolet (UV) lamps. It simulates dew and rain with condensing humidity and water sprays. Exposure conditions can be varied to simulate various end-use environments.

Table 1A and 1B present the results. Listed are the individual formulations together with the corresponding $\Delta b^*$ values as measure for color change after 170, 311 and 488 hours exposure time.

TABLE 1A

PBT Fibers in MB Letdowns in PBT Chip - UV Stabilization Studies using QUV 313 Instrument Normal Wet and Dry Cycle

| Stabilizer Combinations | 170 hrs | 311 hrs Delta b* | 485 hrs |
|---|---|---|---|
| Control A | 9.84 | 14.67 | 24.02 |
| Control B | 9.23 | 15.96 | 21.16 |
| 0.23% SEED | 8.82 | 15.04 | 27.47 |
| 0.19% SEED & 0.26% compound 1 | 7.57 | 12.99 | 25.22 |
| 0.24% SEED & 0.31% compound 1 | 7.37 | 12.99 | 25.39 |
| 0.25% compound 1 | 8.24 | 13.07 | 25.57 |
| 0.21% SEED & 0.58% compound 1 | | 12.37 | 20.07 |
| 0.59% compound 1 | | 12.87 | 24.94 |

SEED stands for 1,3-benzene-di-carboxamide, N,N'-bis-(2,2,6,6-tetramethyl-4-piperidinyl)

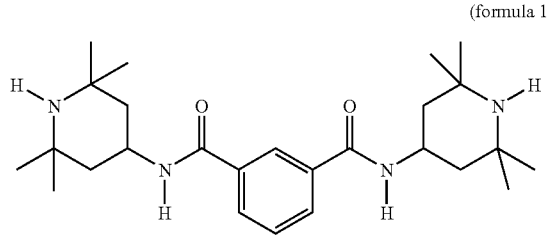

(formula 13)

compound 1 has the formula

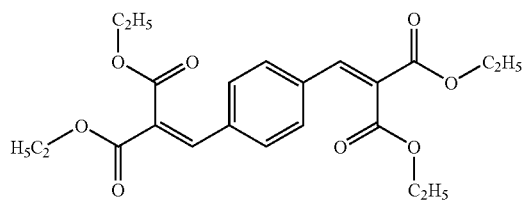

TABLE 1B

PBT Fibers in MB Letdowns in PBT Chip - UV Stabilization Studies using QUV 340 Instrument Normal Wet and Dry Cycles

| Samples: | 170 hrs | 311 hrs Delta b* | 485 hrs |
|---|---|---|---|
| Control A | 7.81 | 10.13 | 16.43 |
| Control B | 6.62 | 8.91 | 14.13 |
| 0.55% compound 1 | 6.36 | 8.87 | 13.51 |
| 0.19% SEED & 0.26% compound 1 | 4.76 | 6.78 | 12.77 |
| 0.59% compound 1 | 4.9 | 12.87 | 24.94 |
| 0.21% SEED & 0.58% compound 1 | 4.31 | 6.18 | 11.93 |

EXAMPLE 2

Effects on Injection Molded Polyethylene-terephthalate (PET)

100 parts of polyethylene-terephthalate commercial name, Arnite (producer DSM, Netherlands) was mixed in a single screw extruder equipped with 8 temperature zones heated from 230° C. to 280° C. (ramping mode) together with 0.2 part of the organo-phosphite based stabilizer tris-(2,4-di-tert.-butyl-phosphite), commercial name Hostanox PAR 24, 0.05 parts of the phenol octadecyl-3,5-di-tert.butyl-4-hydroxylhydrocinnamate, commercial name Hostanox O 16, and 0.025 parts of an UV-absorber or a binary UV-absorber combination (1:1). A speed of rotation of 85 rpm was chosen. Afterwards the individual mixtures were pre-extruded in a single screw extruder type Haendle at a temperature of 210° C. with a speed of rotation of 20 rpm. These pre-extruded formulations were used to prepare plaques (dimensions 75×50×1 mm) by means of injection molding at 300° C. with a pressure of 50 bars and after a cooling period of 19.5 seconds with a reduced pressure (20 bars) within a total cycle time of 27.3 seconds using an injection molding machine type Arburg.

Treatments by aging under UV-irradiation were carried out in order to study the influence of the various UV absorbers and UV absorber-combinations. For this reason UV-CON A treatment according to ASTM D 5208, cycle A were used containing fluorescent lamps with light emission $\lambda \leq 340$ nm. The cycles are characterized by exposure for 20 hours at 50° C. without water condensation followed by a period of 4 hours at 40° C. with water condensation.

Among other tests the physical evaluation of the artificially aged samples took place by gloss measurements which have been executed according to the rules of the "Standard Test Method for Specular Gloss of Plastic Films and Solid Plastics", ASTM designation D 2457-97. This method is under designation of ASTM Committee D-20 on Plastics and is the direct responsibility of Subcommittee D20.40 on Optical Properties. Current edition approved Jan. 10, 1997, published May 1997. The method describes procedures for the measurements of gloss of plastic films and solid plastics, both opaque and transparent, containing separate gloss angles. The instrument used was a gloss-meter type micro-TRI-gloss, producer Byk-Gardener.

For the actual series specular incidence angles of 60° and 85° were chosen, measured against a white background.

Tables 2A and 2B present the results for different formulations depending on the duration of UV-A treatment. It can be shown with these results that combinations of compound 2 with other UV-absorbers like 2-ethyl-2'-ethoxy-oxalanilide (commercial name Sanduvor VSU) exhibit improved gloss.

Compound 2 has the formula

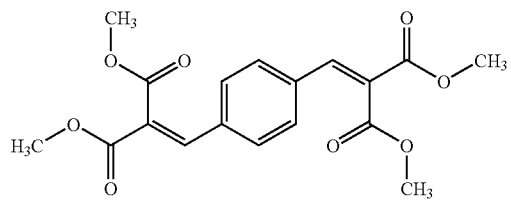

TABLE 2A

Influence of UV-A exposure on Gloss (incident angle 60°) of PET formulations with UV-absorbers

| UV-absorber(s)/% | duration of UV-A exposure/hours | gloss |
|---|---|---|
| 0.025 VSU | 600 | 129 |
| 0.0125 compound 2, 0.0125% VSU | 600 | 131 |
| 0.025 VSU | 1050 | 79 |
| 0.0125 compound 2, 0.0125% VSU | 1050 | 102 |
| 0.025 VSU | 1800 | 32 |
| 0.0125 compound 2, 0.0125% VSU | 1800 | 42 |
| 0.025 VSU | 2200 | 16 |
| 0.0125 compound 2, 0.0125% VSU | 2200 | 29 |
| 0.025 VSU | 3000 | 12 |
| 0.0125 compound 2, 0.0125% VSU | 3000 | 23 |

All samples contain additionally 0.200% Hostanox PAR 24 and 0.050% Hostanox O 16

TABLE 2B

Influence of UV-A exposure on Gloss (incident angle 85°) of PET formulations with UV-absorbers

| UV-absorber(s)/% | duration of UV-A exposure/hours | gloss |
|---|---|---|
| 0.025 VSU | 1050 | 73 |
| 0.0125 compound 2, 0.0125% VSU | 1050 | 83 |

TABLE 2B-continued

Influence of UV-A exposure on Gloss (incident angle 85°) of PET formulations with UV-absorbers

| UV-absorber(s)/% | duration of UV-A exposure/hours | gloss |
|---|---|---|
| 0.025 VSU | 1500 | 65 |
| 0.0125 compound 2, 0.0125% VSU | 1500 | 67 |
| 0.025 VSU | 2200 | 30 |
| 0.0125 compound 2, 0.0125% VSU | 2200 | 69 |

All samples contain 0.200% Hostanox PAR 24 and 0.05% Hostanox O 16

Another important physical and technical parameter is the transparency which has to maintained during a long service time at a level as high as possible. Like for the gloss measurement PET samples have been investigated before and after artificial UV-A-exposure. The transparency measurements took place according to "Standard Test Methods for Transparency of Plastic Sheeting", ASTM designation D 1746-96; current edition approved Aug. 10, 1996, published February 1997; originally published as D 1746-60. For the measurements a spectrophotometer, type Minolta CM 3500 D has been used at wavelength of 700 nm.

The corresponding results are summarized in Table 2C.

As Table 2C demostrates, the use of bis-benzylidene malonates and other UV absorbers, in accordance with the present invention, results in improved transparency.

TABLE 2C

Influence of UV-A exposure on Transparency of PET formulations with UV-absorbers

| UV-absorber(s)/% | duration of UV-A exposure/hours | transparency at wavelength of 700 nm |
|---|---|---|
| 0.025 VSU | 0 | 87.14 |
| 0.0125 compound 2, 0.0125% VSU | 0 | 87.19 |
| 0.025 VSU | 150 | 87.42 |
| 0.0125 compound 2, 0.0125% VSU | 150 | 87.49 |
| 0.025 VSU | 300 | 87.54 |
| 0.0125 compound 2, 0.0125% VSU | 300 | 87.58 |
| 0.025 VSU | 600 | 87.37 |
| 0.0125 compound 2, 0.0125% VSU | 600 | 87.53 |
| 0.025 VSU | 1200 | 86.06 |
| 0.0125 compound 2, 0.0125% VSU | 1200 | 86.11 |
| 0.025 VSU | 1500 | 82.37 |
| 0.0125 compound 2, 0.0125% VSU | 1500 | 83.64 |
| 0.025 VSU | 1800 | 82.01 |
| 0.0125 compound 2, 0.0125% VSU | 1800 | 85.01 |
| 0.025 VSU | 3000 | 81.96 |
| 0.0125 compound 2, 0.0125% VSU | 3000 | 84.31 |

All samples contain 0.200% Hostanox PAR 24 and 0.05% Hostanox O 16

Another important technical consideration is the control of the yellowness index (YI) which is a measure of the tendency of plastics to turn yellow upon long-term exposure to light. The process for its measurement is disclosed in DIN 6167 ("Description of yellowness of near-white or near-colorless materials") which was applied to samples of this example. As already mentioned for the transparency measurements, the instrument used for this test was a spectrophotometer, type Minolta CM 3500 D. Table 2D renders the YI-values comparing the data of a single UV absorber VSU and its combination with benzylidene-bis-malonate compound 2.

TABLE 2D

Influence of UV-A exposure on Yellowness Index (YI) of PET formulations with UV-absorbers

| UV-absorber(s)/% | duration of UV-A exposure/hours | YI |
|---|---|---|
| 0.025 VSU | 150 | 2.77 |
| 0.0125 compound 2, 0.0125% VSU | 150 | 2.41 |
| 0.025 VSU | 300 | 3.26 |
| 0.0125 compound 2, 0.0125% VSU | 300 | 2.7 |
| 0.025 VSU | 600 | 4.29 |
| 0.0125 compound 2, 0.0125% VSU | 600 | 3.39 |
| 0.025 VSU | 900 | 5.03 |
| 0.0125 compound 2, 0.0125% VSU | 900 | 4.27 |
| 0.025 VSU | 1200 | 6.37 |
| 0.0125 compound 2, 0.0125% VSU | 1200 | 5.62 |
| 0.025 VSU | 1500 | 9.16 |
| 0.0125 compound 2, 0.0125% VSU | 1500 | 7.12 |
| 0.025 VSU | 1800 | 10.87 |
| 0.0125 compound 2, 0.0125% VSU | 1800 | 7.36 |
| 0.025 VSU | 3000 | 10.8 |
| 0.0125 compound 2, 0.0125% VSU | 3000 | 8.4 |

All samples contain 0.200% Hostanox PAR 24 and 0.05% Hostanox O 16

EXAMPLE 3

Effects in Acrylonitrile-butadiene-styrene (ABS)

An impressive efficacy of benzylidene-bis-malonates in combination with sterically hindered phenols, according to the present invention, is demonstrated using ABS. ABS is known to be a copolymer of acrylonitrile, butadiene and styrene. ABS is often used as the cost and performance dividing line between standard plastics (PVC, polyethylene, polystyrene, etc.) and engineering plastics (polyacrylic, nylon, polyacetal, etc.). ABS, which is commercially available in nearly 1000 different grades, can be given a range of properties, depending on the ratio of the monomeric constituents and the molecular level connectivity. The selection of the right stabilizers is an essential factor for the use of ABS as an important plastic material. This includes the long-term protection against thermo-oxidative degradation which can be provided by use of sterically hindered phenols which are capable of preventing the abstraction of hydrogen from the polymer backbone, a fact known from the literature for years [see e.g. G. Scott in "Atmospheric Oxidation and Antioxidants" $1^{st}$ edition, Elsevier Publisher Comp., London (1965)]. A drawback of the use of sterically hindered phenols is a continuous discoloration measurable by increase of the yellowness index (YI) of the substrate due to the formation of transformation products with quinoid structures. Their generation depends on the substitution pattern of the phenol used [see P. P. Klemchuk and P. L. Horngg, Polym. Degrad. Stab., 34, pp.333 (1991)].

Surprisingly it has been shown that the addition of benzylidene-bis-malonates represses the described discoloration. This advantageous effect which is demonstrated below (Table 3).

The experimental execution took place as follows:

100 parts of acrylonitrile-butadiene-styrene-copolymer (ABS) type 3513 (supplier Clariant) was mixed in a single screw extruder equipped with 8 temperature zones heated from 230° C. to 280° C. (ramping mode)

together with 0.05 parts of the phenol octadecyl-3,5-di-tert.butyl-4-hydroxylhydrocinnamate, commercial name Hostanox O 16, or 0.05 parts of an UV-absorber or 0.05 parts of a binary (1:1) combination of two UV-absorbers or one UV-absorber and the above mentioned sterically hindered phenol (1:1). For the extruder the speed of rotation of 85 rpm was chosen. Afterwards the individual mixtures were pre-extruded in a single screw extruder type Haendle at a temperature of 220° C. with a speed of rotation of 50 rpm. These pre-extruded formulations were used to prepare plaques (dimensions 75×50×1 mm) by means of injection molding at 240° C. with a pressure of 50 bars and after a cooling period of 19.5 seconds with a reduced pressure (20 bars) within a total cycle time of 27.3 seconds using an injection molding machine type Arburg.

The plaques were placed in a forced air draft oven (type Memmert) heated up to T=80° C. After planned daily withdrawals, the difference of the yellowness index ΔYI to the initial value before heat treatment in the oven was measured by means of spectrophotometer, type Minolta CM 3500 D.

The results as shown in Table 3 indicate clearly the unexpected synergistic behavior of benzylidene-bis-malonates with sterically hindered phenols.

TABLE 3

Influence of oven aging at T = 80° C. on discoloration of ABS-plaques

| Formulation | Time to reach a color change ΔE = 2/days | Color change ΔE after 129 days |
|---|---|---|
| 0.05% Hostanox O 16 | 21 | 11.7 |
| 0.05% compound 1 | 86.1 | 2.4 |
| 0.025% Hostanox O 16 + 0.05% compound 1 | >129 | 1.89 |
| 0.05% compound 2 | 123 | 2.1 |
| 0.025% Hostanox O 16 + 0.05% compound 2 | >129 | 1.82 |

Hostanox O 16, used in the previous examples, has the following formula:

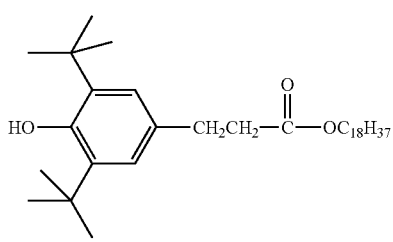

The invention claimed is:

1. A mixture of compounds comprising one or more compounds of the general formula

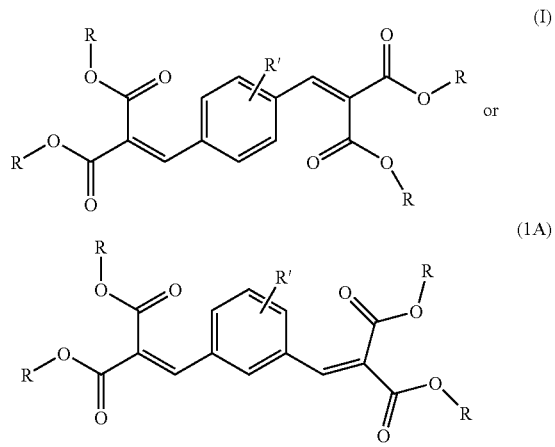

wherein the groups R independently stand for an alkyl-, cycloalkyl-, or aralkyl- whereas the aromatic ring system may be optionally substituted by one or more groups R' which may be identical or different and which groups R' can be an aryl-, a saturated or unsaturated alkyl-, aralkyl- or cycloalkyl-group as well as halogen, an amino-, aminoalkyl-, aminocycloalkyl-, cyano-, thiocyano- or nitrogroup;

a UV-absorber of the formula 2

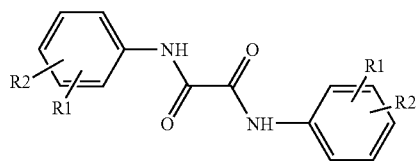

wherein $R_1$ and $R_2$ are each independently, hydrogen or identical or different substituents selected from the group consisting of linear end branched alkyl- or alkoxy-groups having from 2 to 12 carbon atoms and from 1 to 4 oxygen atoms, and at least one compound selected from the group consisting of a hindered amine stabilizer, sterically hindered phenol, organophosphine, organophosphite, organophosphonite, and mixtures thereof.

2. The mixture of compounds according to claim 1, wherein the hindered amine stabilizer is a compound of the formulae 3 or 4

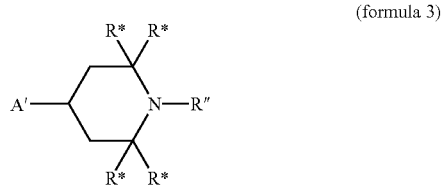

(formula 3)

in which A' comprises a functional group which is an amine, or A' contains a hydrolyzable group that forms an amine, or A' is an amide-forming group, R* is methyl or other lower ($C_2$–$C_4$ alkyl) and R" is selected from the group consisting of hydrogen, alkyl of 1 to 3 carbons and —$OR_3$ in which $R_3$ is selected from the group consisting of hydrogen, methyl, and alkyl containing 1 to 7 carbons

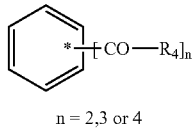
(formula 4)

n = 2,3 or 4 including dimers and trimers, in which at least one of $R_4$ is —OH, —OR, and at least one of $R_4$ is $R_a$, $R_b$ or $R_c$

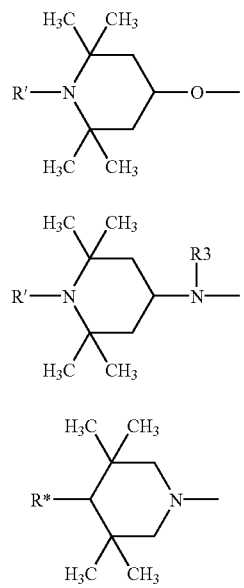

($R_a$)

($R_b$)

($R_c$)

wherein R* is defined above, end R' has the same meaning as A' above, R6 is selected from the group consisting of hydrogen, alkyl or cycloalkyl with 1 to 6 carbon atoms.

3. The mixture of compounds according to claim 2, wherein the hindered amine is a compound represented by formula (5)–(11):

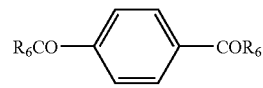
(formula 5)

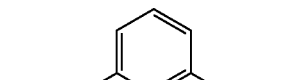
(formula 6)

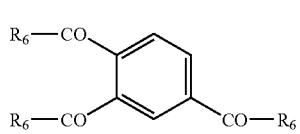
(formula 7)

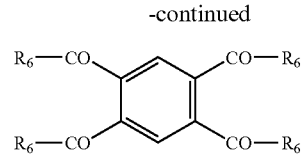
(formula 8)

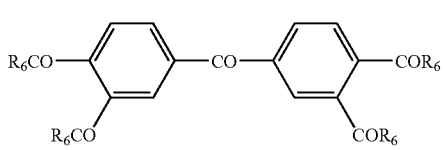
(formula 9)

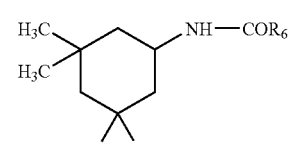
(formula 10)

(formula 11)

$R_6$—CO—⌬—NH—CO—⌬—CO—$R_6$ wherein in formula 5–11 $R_a$ can also be either formula (a') or (a")

(a')

(a")

where R' in a' and a" is hydrogen, $C_{1-6}$ alkyl or cycloalkyl, e.g., —$CH_3$, —$CH_2CH_3$, $C_{1-4}$alkoxy, e.g., —$OCH_3$, —$OCH_2CH_3$ or —CO—$C_{1-4}$alkyl, e.g., —O—CO—$CH_3$, —O—CO—$CH_2CH_3$.

4. The mixture of compounds according to claim 2, wherein the hindered amine is a compound selected from 4-amino-2,2',6,6'-tetramethylpiperidine, 4-aminoalkyl-2,2',6,6'-tetramethylpiperidine, 4-aminoaryl-2,2',6,6'-tetramethylpiperidine, 3-aminoalkyl-2,2',6,6'-tetramethylpiperidine, 3-aminoaryl-2,2',6,6'-tetramethylpiperidine, 2,2',6,6'-tetramethyl-4-piperidine-alkylcarboxylic acid, 2,2',6,6'-tetramethyl-4-piperidine-arylcarboxylic acid, 2,2',6,6'-tetramethyl-3-piperidine-alkylcarboxylic acid, and 2,2',6,6'-tetramethyl-3-piperidine-arylcarboxylic acid.

5. The mixture of compounds according to claim 1, wherein the sterically hindered phenol is selected from the group consisting of formulae α, β, and mixtures thereof

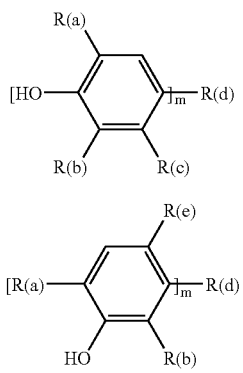

(formula α)

(formula β)

in which m is the number 1 or 3,
R(a) is $C_1$–$C_{18}$-alkyl, $C_5$–$C_{12}$-cyclo-alkyl, phenyl or $C_7$–$C_9$-phenyl-alkyl,
R(b) is hydrogen, $C_1$–$C_{18}$-alkyl, $C_5$–$C_{12}$-cyclo-alkyl, phenyl or $C_7$–$C_9$-phenyl-alkyl,
R(c) is hydrogen or methyl;
if m is 1,
R(d) is hydrogen, $C_1$–$C_4$-alkyl or

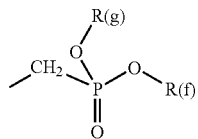

if m is 3,
R(d) is

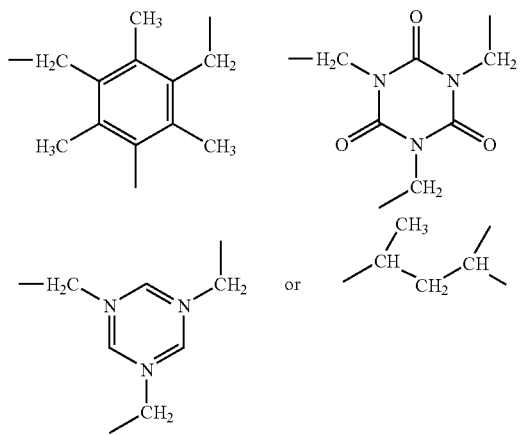

R(e) is hydrogen or methyl,
R(f) is hydrogen, $C_1$–$C_{20}$-alkyl, unsubstituted or $C_1$–$C_4$-alkyl-substituted phenyl or naphthyl,
R(g) is $C_1$–$C_{20}$-alkyl, unsubstituted or $C_1$–$C_4$-alkyl-substituted phenyl or naphthyl,
particularly compounds (I)–(VIII)
bis-[3,3-bis-(4'-hydroxy-3'-tert.butyl)-butanoic acid]-glycolester (I), 4,4',4"-[2,4,6-trimethyl-1,3,5-benzenetriyl)tris(methylene)]-tris[2,6-bis(1,1-dimethylethyl)phenol] (II),
1,3,5-triazine-2,4,6(1H,3H,5H)-trione-1,3,5-tris[[4-(1,1-dimethylethyl)-3-hydroxy-2,6-dimethylphenyl]methyl] (III), phenol, 4,4',4"-(1-methyl-1-propanyl-3-ylidene)tris[2-(1,1-dimethylethyl)-5-methyl (IV), phenol,2,6-bis[[3-(1,1-dimethylethyl)-2-hydroxy-5-methylphenyl]octahydro-4,7-methane-1H-indenyl]-4-methyl (V), benzenepropanoic acid, 3-(1,1-dimethylethyl)-4-hydroxy-5-methyl-, 2,4,8,10-tetraoxa-spiro[5,5]undecane-3,9-diyl-bis(2,2-dimethyl-2,1-ethenediyl) ester (VI), tetrakismethylene(3,5-di-tert.butyl-4-hydroxyphenyl)-hydrocinnamate (VII) and octadecyl-3,5-bis(1,1-dimethylethyl)-4-hydroxybenzenepropanoate (VIII).

6. The mixture of compounds according to claim 1, wherein the organophosphine is selected from the group consisting of:

 (IX)

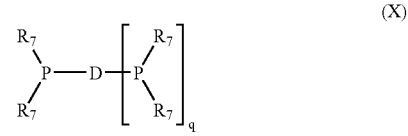 (X)

 (XI)

 (XII)

wherein
$R_7$ is equal to $C_{1-24}$ alkyl linear or branched optionally containing heteroatoms N, O, P, or S, $C_{5-30}$ cycloalkyl optionally containing heteroatoms N, O, P, or S, $C_{1-20}$ alkylaryl, $C_{6-24}$ aryl, $C_{4-24}$ heteroaryl single or multiple substituted by linear or branched $C_{1-18}$ alkyl, $C_{5-12}$ cycloalkyl or $C_{1-18}$ alkoxy;
$R_8$ is equal to $C_{4-24}$ alkyl linear or branched optionally containing heteroatoms N, O, P, or S, $C_{5-30}$ cycloalkyl optionally containing heteroatoms N, O, P, or S, $C_{1-30}$ alkylaryl, $C_{6-24}$ aryl, $C_{4-24}$ heteroaryl single or multiple substituted by linear or branched $C_{1-18}$ alkyl, $C_{5-12}$ cycloalkyl or $C_{1-18}$ alkoxy,
D is equal to $C_{1-30}$ alkylene linear or branched optionally containing heteroatoms N, O, P, or S, $C_{2-30}$ alkylidene optionally containing heteroatoms N, O, P, or S, $C_{5-12}$ cycloalkylene optionally containing heteroatoms N, O, P, or S, or $C_{6-24}$ arylene/$C_{4-24}$ heteroarylene single or multiple substituted by linear or branched $C_{1-18}$ alkyl, $C_{5-12}$ cycloalkyl or $C_{1-18}$ alkoxy, —O—, —S—,
Q is 1 to 5;
R is 3 to 6; and
wherein the groups P—$R_8$ in formula (XII) can be part of a P-containing ring system, indicated by * on the bonds coming from this P-atom.

7. The mixture of compounds according to claim 1, wherein the organophosponite is selected from the group consisting of:

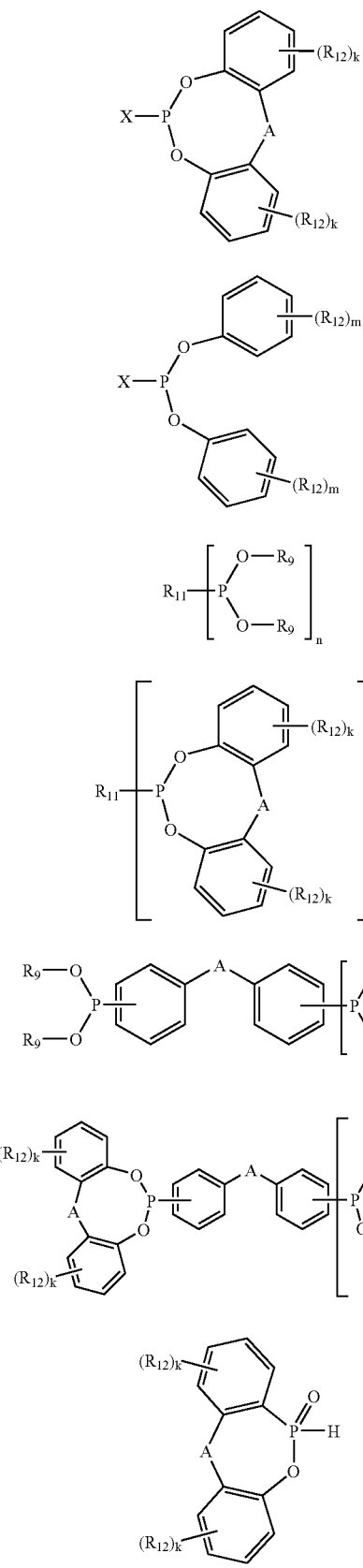

(XIII)

(XIV)

(XV)

(XVI)

(XVII)

(XVIII)

(XIX)

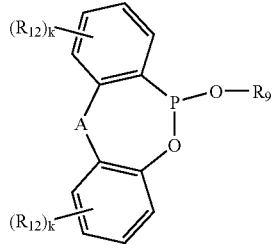

(XX)

wherein, independently of one another,

R$_4$ is C$_1$–C$_{24}$ alkyl linear or branched, optionally containing heteroatoms N, O, P, or S, C$_5$–C$_{30}$-cycloalkyl optionally containing heteroatoms N, O, P, or S, C$_1$–C$_{30}$-alkylaryl, C$_8$–C$_{24}$-aryl or heteroaryl, C$_8$–C$_{24}$-aryl or heteroaryl substituted with the groups C$_1$–C$_{18}$-alkyl (linear or branched), C$_5$–C$_{12}$-cycloalkyl or C$_1$–C$_{18}$-alkoxy;

R$_{11}$ is n-valent groups of the type C$_1$–C$_{30}$-alkylene linear or branched, optionally containing heteroatoms N, O, P, or S, C$_1$–C$_{30}$-alkylidene optionally containing heteroatoms N, O, P, or S, C$_5$–C$_{12}$cycloalkylene or C$_8$–C$_{24}$-arylene optionally substituted with C$_1$–C$_{18}$ alkyl (linear or branched), C$_5$–C$_{12}$-cycloalkyl or C$_1$–C$_{18}$ alkoxy);

R$_{12}$ is C$_1$–C$_{24}$ alkyl linear or branched, optionally containing heteroatoms N, O, P, or S, C$_5$–C$_{30}$-cycloalkyl optionally containing heteroatoms N, O, P, or S, C$_1$–C$_{30}$-alkylaryl, C$_6$–C$_{24}$-aryl or heteroaryl, C$_6$–C$_{24}$-aryl or heteroaryl (substituted with the groups C$_1$–C$_{18}$-alkyl (linear or branched), C$_5$–C$_{12}$-cycloalkyl or C$_1$–C$_{18}$-alkoxy);

A is a direct bond, C$_1$–C$_{30}$-alkylidene optionally containing heteroatoms N, O, P, or S, >NH, >NR$_8$, —S—, >S(O), >S(O)$_2$, —O—;

X is Cl, Br, F, OH including the resulting tautomeric form >P(O)H;

k is from 0 to 4;

n is from 1 to 4;

m is from 0 to 5; and p is 0 or 1.

8. The mixture of compounds according to claim 1, wherein the organophosphite is selected from the group consisting of:

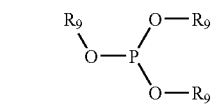

(XXI)

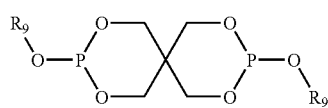

(XXII)

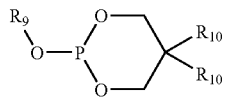

(XXIII)

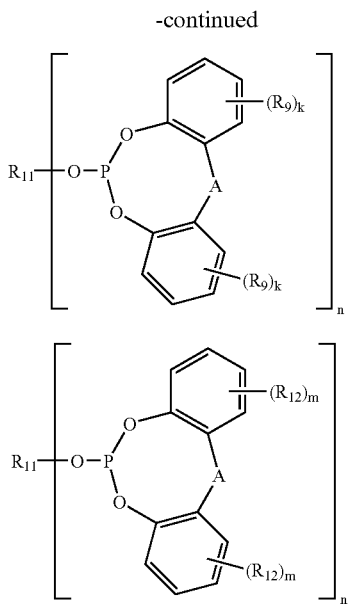

(XXIV)

(XXV)

wherein, independently of one another,

R$_a$ is C$_1$–C$_{24}$ alkyl linear or branched, optionally containing heteroatoms N, O, P, or S, C$_5$–C$_{30}$-cycloalkyl optionally containing heteroatoms N, O, P, or S, C$_1$–C$_{30}$-alkylaryl, C$_6$–C$_{24}$-aryl or heteroaryl, C$_6$–C$_{24}$-aryl or heteroaryl (substituted with the groups C$_1$–C$_{18}$-alkyl (linear or branched), C$_5$–C$_{12}$-cycloalkyl or C$_1$–C$_{18}$-alkoxy);

R$_{10}$ is H, C$_1$–C$_{24}$ alkyl linear or branched, optionally containing heteroatoms N, O, P, or S, C$_5$–C$_{30}$-cycloalkyl optionally containing heteroatoms N, O, P, or S, C$_1$–C$_{30}$-alkylaryl, C$_6$–C$_{24}$-aryl or heteroaryl, C$_6$–C$_{24}$-aryl or heteroaryl (substituted with the groups C$_1$–C$_{18}$-alkyl (linear or branched), C$_5$–C$_{12}$-cycloalkyl or C$_1$–C$_{18}$-alkoxy);

R$_{11}$ is n-valent groups of the type C$_1$–C$_{30}$-alkylene linear or branched, optionally containing heteroatoms N, O, P, or S, C$_1$–C$_{30}$-alkylidene optionally containing heteroatoms N, O, P, or S, C$_5$–C$_{12}$-cycloalkylene or C$_6$–C$_{24}$-arylene optionally substituted with C$_1$–C$_{18}$ alkyl (linear or branched), C$_5$–C$_{12}$-cycloalkyl or C$_1$–C$_{18}$ alkoxy;

R$_{12}$ is C$_1$–C$_{24}$ alkyl linear or branched, optionally containing heteroatoms N, O, P, or S, C$_5$–C$_{30}$-cycloalkyl optionally containing heteroatoms N, O, P, or S, C$_1$–C$_{30}$-alkylaryl, C$_6$–C$_{24}$-aryl or heteroaryl, C$_6$–C$_{24}$-aryl or heteroaryl (substituted with the groups C$_1$–C$_{18}$-alkyl (linear or branched), C$_5$–C$_{12}$-cycloalkyl or C$_1$–C$_{18}$ alkoxy;

A is a direct bond, C$_1$–C$_{30}$-alkylidene optionally containing heteroatoms N, O, P, or S, >NH, >NR$_8$, —S—, >S(O), >S(O)$_2$, —O—;

X is Cl, Br, F, OH including the resulting tautomeric form >P(O)H;

k is from 0 to 4;

n is from 1 to 4;

m is from 0 to 5; and p is 0 or 1.

9. A mixture of compounds comprising one or more compounds of the general formula

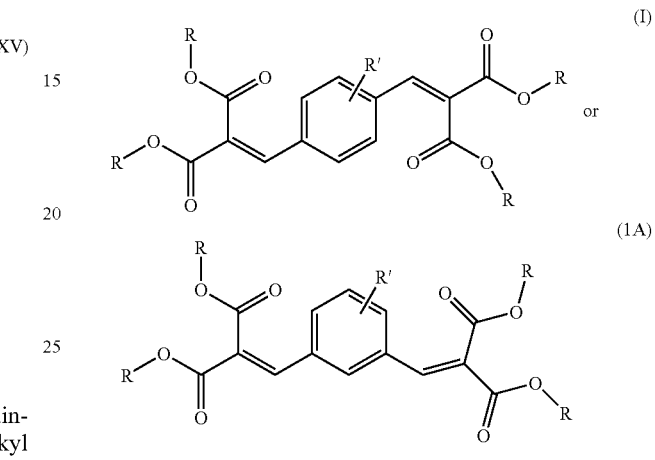

wherein the groups R independently stand for an alkyl-, cycloalkyl-, or aralkyl- whereas the aromatic ring system may be optionally substituted by one or more groups R' which may be identical or different and which groups R' can be an aryl-, a saturated or unsaturated alkyl-, aralkyl- or cycloalkyl-group as well as halogen, an amino-, aminoalkyl-, aminocycloalkyl-, cyano-, thiocyano- or nitro-group; and a UV-absorber of the formula 2

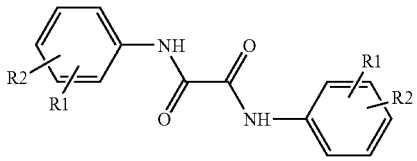

wherein R$_1$ and R$_2$ are each independently, hydrogen or identical or different substituents selected from the group consisting of linear and branched alkyl- or alkoxy-groups having from 2 to 12 carbon atoms and from 1 to 4 oxygen atoms.

* * * * *